US012746786B2

(12) United States Patent
McGuire

(10) Patent No.: US 12,746,786 B2
(45) Date of Patent: Sep. 29, 2026

(54) FOLDABLE TIRE REMOVAL AND INSTALLATION TOOL ASSEMBLY

(71) Applicant: Shawn McGuire, Seattle, WA (US)

(72) Inventor: Shawn McGuire, Seattle, WA (US)

( * ) Notice: Subject to any disclaimer, the term of this patent is extended or adjusted under 35 U.S.C. 154(b) by 292 days.

(21) Appl. No.: 18/622,957

(22) Filed: Mar. 31, 2024

(65) Prior Publication Data

US 2025/0303804 A1 Oct. 2, 2025

(51) Int. Cl.
*B60C 25/02* (2006.01)

(52) U.S. Cl.
CPC .................................... *B60C 25/02* (2013.01)

(58) Field of Classification Search
CPC ....... B60C 25/01; B60C 25/015; B60C 25/02; B60C 25/0575; B60C 25/0578; B60C 25/12; B60C 25/125; B60C 25/135; B60C 25/14; B60C 25/15; B25G 1/08; B25B 27/0007; B25B 27/0028; B25B 27/0035; B25F 1/02; B25F 1/04
See application file for complete search history.

(56) References Cited

U.S. PATENT DOCUMENTS 2,189,683 A * 2/1940 Schultz ................... B60C 25/02 157/1.22
2,394,845 A * 2/1946 Cothern .................... B25F 1/04 7/168
5,857,509 A * 1/1999 Winefordner ........... B60C 25/02 157/1.17
6,044,508 A * 4/2000 Chuang ............... B25B 27/0071 7/138
11,407,100 B1 * 8/2022 Dogka ................... B25H 7/005
D963,443 S * 9/2022 Tarnay ............................. D8/14
2008/0033466 A1 * 2/2008 Assell ............ A61B 17/320016 606/171

FOREIGN PATENT DOCUMENTS

CN 219229285 * 6/2023
GB 2068307 * 8/1981

* cited by examiner

*Primary Examiner* — Robert J Scruggs
(74) *Attorney, Agent, or Firm* — Alloy Patent Law; Walker Griffin Weitzel

(57) ABSTRACT

The present disclosure relates to a portable, hand-operated, and foldable tire removal and/or installation tool assembly and a method of removing and installing a tire on the rim of a wheel. The portable, hand-operated, and foldable tire removal and/or installation tool assembly comprises a handle, a bead gripper, a rim bracer, and a connection mechanism. The handle, the rim bracer, and the bead gripper are rotatably connected by the connection mechanism. The handle and the rim bracer include integrated tire levers that eliminate the need to carry separate tire levers. The connection mechanism is configured to be operated to arrange the handle, the rim bracer, and the bead gripper in a folding position to occupy minimal space to allow for convenient storage.

17 Claims, 14 Drawing Sheets

FOLDABLE TIRE REMOVAL AND INSTALLATION TOOL ASSEMBLY

FIELD OF THE INVENTION

The present invention relates to the field of tire repair and replacement, and more particularly, the present invention relates to a multi-purpose, hand-operated, and foldable tool for the removal and installation of a tire on the rim of a wheel.

BACKGROUND

Vehicles such as bicycles, motorcycles, and cars are used all around the world by a variety of people for various purposes. Vehicle tires often need service and replacement due to various factors such as due to wear and tear, when they are punctured, rim balancing and rim repair, damage occurring due to weather, and so on. When a tire is installed onto a rim and inflated it will "seat" onto the rim. The edge of a tire that sits on the wheel is called the tire bead. Wheels of cars, bicycles, and motorcycles are generally made with a small slot or groove for the tire bead to sit in. Air pressure within the tire keeps the bead in this groove when the tire is properly inflated.

When a tire is to be replaced, the tire must be released from the rim of the wheel, and the bead must be "broken". In breaking the bead, care must be taken such that the wheel does not get damaged. If a sharp implement (tool) is used, such as a knife or screwdriver, care must be taken so that the implement does not slip and damage the finish of the wheel. The process of tire removal can be even more difficult if sealant has been used.

A large variety of hand-operated, and power-assisted tire demounting tools already exist in the market that addresses to solve the aforementioned problems. They range from simple pry bars to geometrically complex leveraging devices, along with power-operated demounting devices. However, there are several inherent limitations to the current methods and apparatuses for tire demounting. These limitations range from functionality to adaptability. They fail to address some key factors in the successful removal of a tire from the rim or wheel assembly and are complex in use and inconvenient to carry and store later after use. The bike rider faces the problem of carrying the extra-large weight of the tools and further, the volume of the conventional tire replacement tool is large making it difficult and cumbersome for bike riders to conveniently store them.

Many tires are difficult to seat back onto a bicycle rim. For this reason, bicycle tire "bead jack" tools are used by many bike shops and home mechanics. However, these tools can be cumbersome to carry easily on bike rides for use in the case where there is a need for a tire change; usually as a result of a flat tire. Many current bead jacks don't fold into a small enough form factor to fit easily into bicycle saddle bags.

The existing solutions related to tire replacement are ineffective, complex in use, difficult to manufacture, inconvenient to carry, and inefficient in use. There is a need for an effective and efficient solution that solves the aforementioned problem by providing a portable, hand-operated, and foldable tire removal and/or installation tool assembly while reducing the weight and volume of the tools needed given the limited storage space available for tools when riding.

SUMMARY

An object of the present invention is to provide a portable, hand-operated, and foldable tire removal and/or installation tool assembly that can serve dual purpose of tire removal as well as tire installation.

An object of the present invention is to provide a portable, hand-operated, and foldable tire removal and/or installation tool assembly that can be easily stored after use.

An object of the present invention is to provide a portable, hand-operated, and foldable tire removal and/or installation tool assembly that eliminates the need for carrying separate tire levers for tire removal.

While the way that the present disclosure addresses the disadvantages of the prior art will be discussed in greater detail below, in general, the present disclosure provides a portable, hand-operated, and foldable tire removal and/or installation tool assembly comprising (a) a handle comprising a gripping portion that is configured to be gripped and manipulated by hands of a user, wherein the handle further comprises an integrated tire lever to facilitate removal of the tire from the rim of the wheel, (b) a rim bracer comprising a rim engaging portion that is configured to engage with an edge of a rim of a wheel; and the rim bracer further comprises an integrated tire lever to facilitate removal of the tire from the rim of the wheel, (c) a bead gripper comprising a bead engaging portion that is configured to engage with a tire bead, and the bead engaging portion of the bead gripper is further configured to displace the tire bead relative to the rim of the wheel. The handle, the rim bracer, and the bead gripper are rotatably connected by a connection mechanism, wherein the connection mechanism is configured to be operated to selectively deploy the portable, hand-held, and foldable tire removal and/or installation tool assembly in either: a deployed position and a folding position by enabling rotation of at least one of: the handle, the rim bracer, and the bead gripper. The connection mechanism is further configured to be operated to selectively enable disassembly and reassembly of the portable, hand-held, and foldable tire removal and/or installation tool assembly.

In an embodiment, in the folding position, the handle, the rim bracer, and the bead gripper are arranged to occupy minimal space to allow for convenient storage; and in the deployed position, the portable, hand-held, and foldable tire removal and/or installation tool assembly is configured to remove and/or install tire on the rim of a wheel.

In an embodiment, the wheel is selected from a group comprising of a bicycle wheel, a tricycle wheel, aa motorcycle wheel, and a car wheel.

In an embodiment, the handle comprises a detent, and the rim bracer comprises a curvilinear slot to limit the angular range of the rotation of the rim bracer relative to the handle.

In an embodiment, the connection mechanism comprises a thumbscrew and a threaded nut.

In an embodiment, the rim bracer comprises a threaded insert.

Embodiments of the present invention further discloses a method of removing and installing a tire on a rim of a wheel comprising the steps of: (a) providing a tool kit that comprises a handle, a rim bracer, a bead gripper and a connection mechanism; (b) removing the tire from the rim of the wheel by using at least one of: an integrated tire lever of the handle and an integrated tire lever of the rim bracer; (c) connecting the handle, the rim bracer, the bead gripper and the connection mechanism to thereby assemble a portable, hand-held, and foldable tire removal and/or installation tool assembly in a deployed position; wherein the handle, the rim bracer, and the bead gripper are rotatably connected by a connection mechanism, and (d) gripping and manipulating a gripping portion of the handle to engage a rim engaging portion of the rim bracer with an edge of a rim of the wheel and engage the bead engaging portion of the bead gripper with the tire bead, and further manipulating the gripping portion of the handle to displace the tire bead relative to the rim of the wheel by the bead engaging portion of the bead gripper, to thereby install the tire on the rim of the wheel.

In an embodiment, the method of removing and installing a tire on a rim of a wheel includes deploying the portable, hand-held, and foldable tire removal and/or installation tool assembly in a folding position after use to occupy minimal space to allow for convenient storage.

These and other features and advantages of the present invention will become apparent from the detailed description below, in light of the accompanying drawings.

BRIEF DESCRIPTION OF THE DRAWINGS

A more complete understanding of the present disclosure may be derived by referring to the detailed description and claims when considered in connection with the figures, wherein like reference numerals refer to similar elements throughout the figures.

DETAILED DESCRIPTION

The following description is of exemplary embodiments of the invention only and is not intended to limit the scope, applicability, or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, attachment mechanisms and the like and still fall within the scope of the present invention. Thus, the detailed description herein is presented for purposes of illustration only and not for limitation.

Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

The portable, hand-operated, and foldable tire removal and/or installation tool assembly will now be described with reference to the accompanying drawings, particularly FIGS. 1-14.

Figure 1:
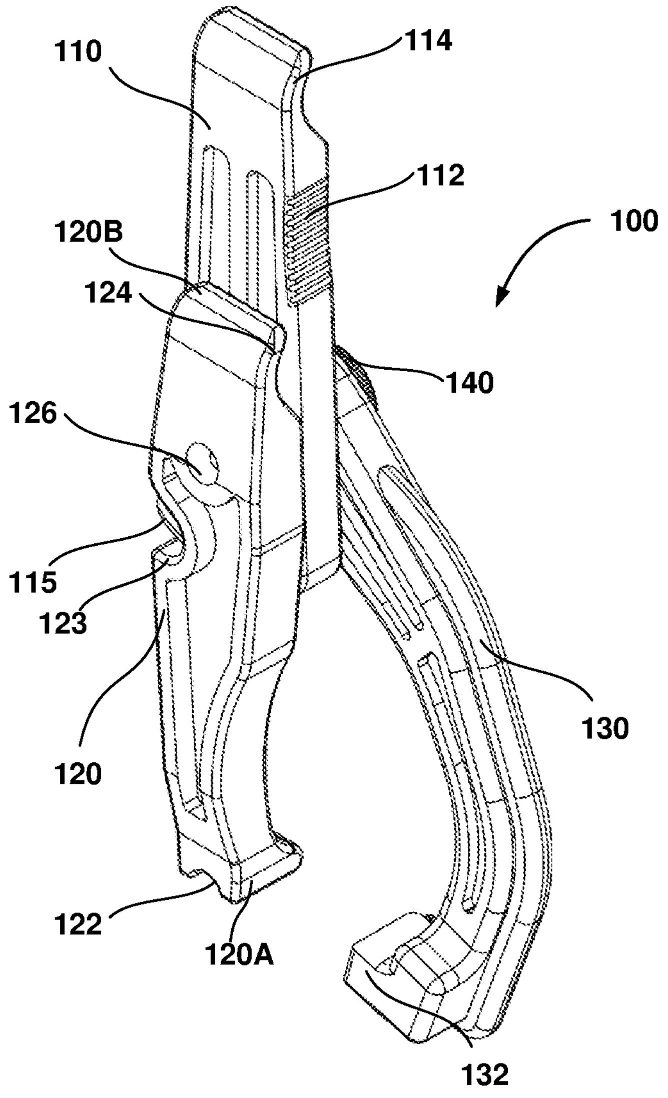
FIG. 1 illustrates a front-perspective view of a portable, hand-operated, and foldable tire removal and/or installation tool assembly in a deployed position, according to an embodiment of the present invention.

Reference is initially made to FIG. 1 that illustrates a front perspective view of a portable, hand-operated, and foldable tire removal and/or installation tool assembly 100 in a deployed position, according to an embodiment of the present invention. The portable, hand-held, and foldable tire removal and/or installation tool assembly 100 serves a dual purpose of removing a tire from the rim of the wheel and installing the tire on the rim of a wheel, wherein the wheel could include but not limited to: a bicycle wheel, tricycle wheel, motorcycle wheel, car wheel and so on. Further, the wheel could be a tubeless wheel, a tubular wheel, or a clincher wheel. The portable, hand-operated, and foldable tire removal and/or installation tool assembly 100 comprises a handle 110, a rim bracer 120, a bead gripper 130, and a connection mechanism 140, the entirety of which will be described in greater detail in the below description.

Figure 2:
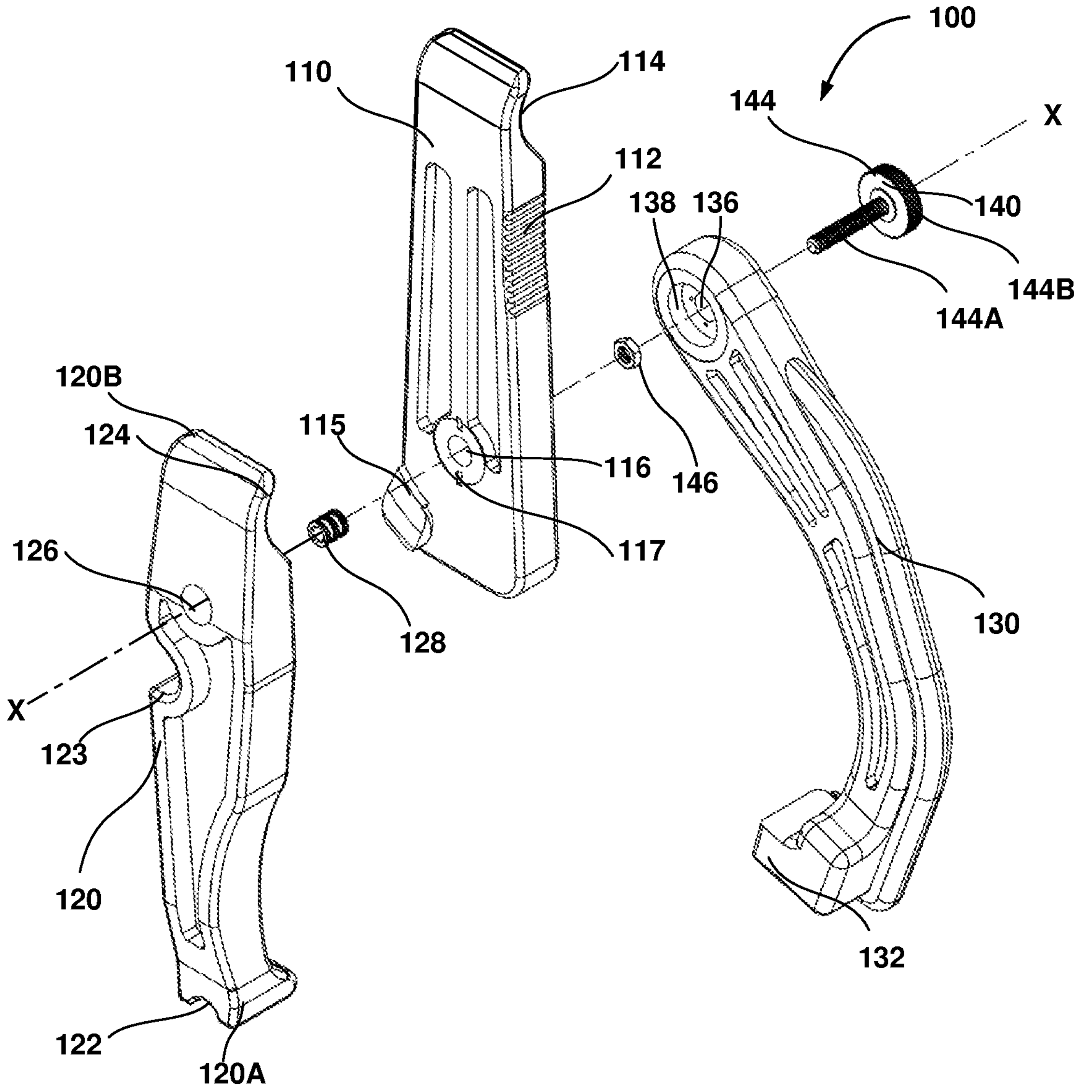
FIG. 2 illustrates an exploded view of the portable, hand-operated, and foldable tire removal and/or installation tool assembly of FIG. 1.
Figure 4:
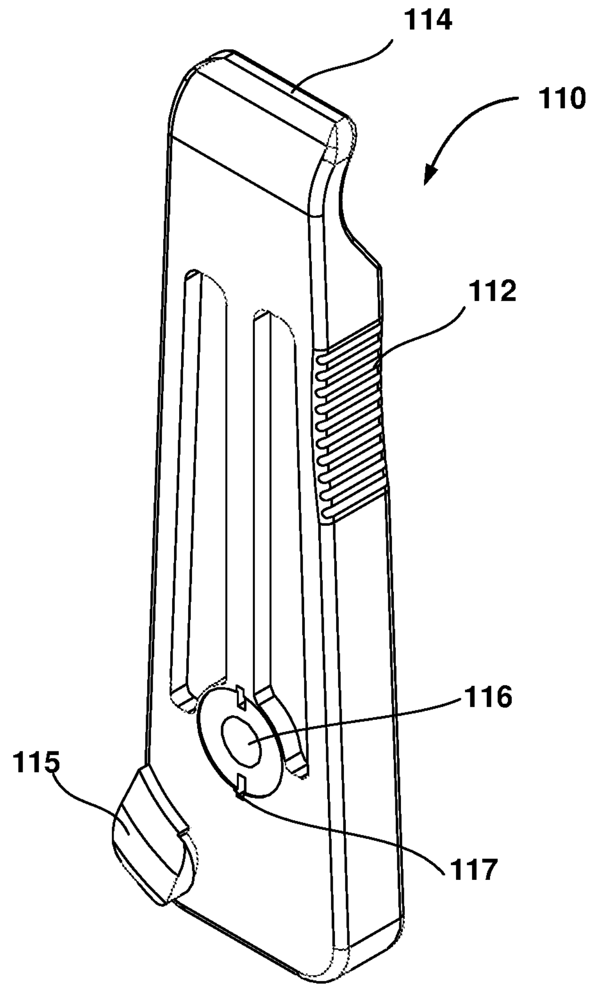
FIG. 4 illustrates a front view of the handle of the portable, hand-operated, and foldable tire removal and/or installation tool assembly of FIG. 1.

Referring to FIGS. 1-2 and FIG. 4, the handle 110 comprises a gripping portion 112 that is ergonomically designed and configured to be gripped and manipulated by the hands of a user. The handle 110 further comprises an integrated tire lever 114 disposed at the first end of the handle 110 to facilitate the removal of the tire from the rim of the wheel. The end of the handle 110 is shaped like a lever to define the integrated tire lever 114. The provision of the integrated tire lever 114 in the handle 110 eliminates the need for carrying an extra lever for tire removal, thereby reducing the weight of tools. The handle 110 comprises a circular hole 116 to allow passage of a threaded shank of a thumbscrew 144 of a connecting mechanism 140. Further, a plurality of female projections 117 are positioned in proximity of the circular hole 116.

Figure 5:
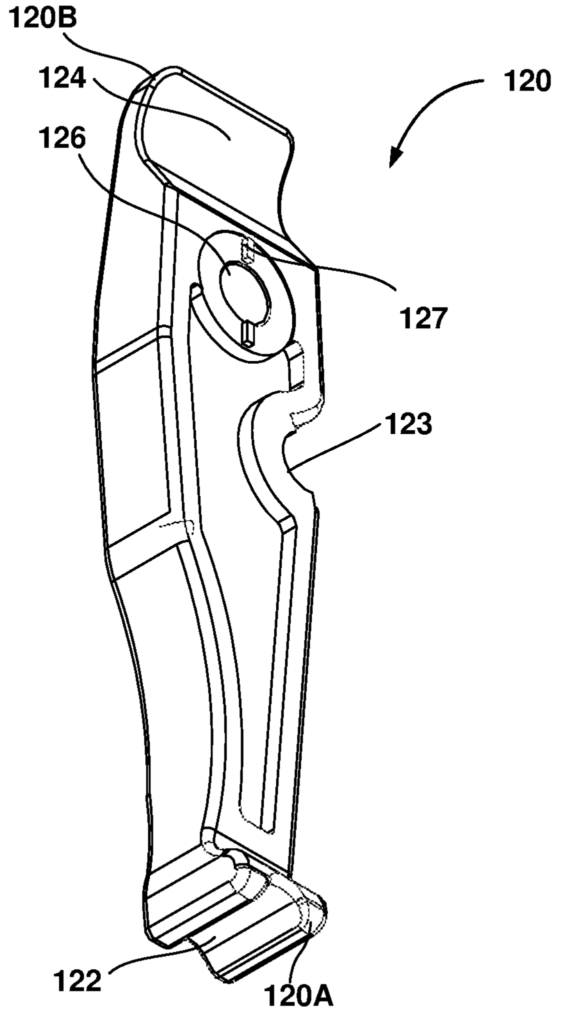
FIG. 5 illustrates a front view of the rim bracer of the portable, hand-operated, and foldable tire removal and/or installation tool assembly of FIG. 1, according to another embodiment of the present invention.

Referring to FIGS. 1-2 and FIG. 5, the rim bracer 120 comprises a rim engaging portion 122 at a side 120A that is configured to engage with an edge of the rim of a wheel. The rim engaging portion 122 is substantially C-shaped to seat on the edge of the rim of the wheel. The rim bracer 120 further comprises an integrated tire lever 124 at an opposite second side 120B of the rim bracer 120 to facilitate the removal of the tire from the rim of the wheel. The side 120A of the rim bracer 120 is shaped like a lever to define the integrated tire lever 124. The provision of the integrated tire lever 124 in the rim bracer 120 eliminates the need for carrying an extra lever for tire removal, thereby reducing the weight of tools. The rim bracer 120 further comprises a circular hole 126. Further, a plurality of male projections 127 are formed in the proximity of the circular hole 126 that is configured to selectively engage with the plurality of female projections 117 of the handle 110 to lock and/or unlock the handle 110 relative to the rim bracer 120 and vice versa. When the handle 110 is locked relative to the rim bracer 120, then the user can unlock the handle 110 relative to the rim bracer 120 by exerting a sufficient rotational force on at least one of the handle 110 and the rim bracer 120.

The handle 110 further comprises a detent 115, and the rim bracer 120 comprises a curvilinear slot 123 that are positioned relative to one another to limit the angular range of the rotation of the rim bracer 120 relative to the handle 110. The detent 115 and the curvilinear slot 123 are shaped to have an "undercut" feature on their respective contact surfaces that acts as a shoulder stop and prevents further rotation of the rim bracer 120 relative to the handle 110 beyond the angular range of rotation. The "undercut" feature prevents the rim bracer 120 from "splaying" (spreading) with respect to the handle 110 when the portable, hand-operated, and foldable tire removal and/or installation tool assembly 100 is used as a bead jack to install tires, which improves performance. Further, the detent 115 has a shape and size that allows the integrated tire lever 124 of the rim bracer 120 to move past (clear) the detent 115 when rotating back into its folded position (not shown in figures).

In an embodiment as seen in FIGS. 1-2, the angular range of the rotation of the rim bracer 120 relative to the handle 110 is 0 to 180 degrees. However, in other embodiments, the angular range of the rotation of the rim bracer 120 relative to the handle 110 could be slightly more/less than 180 degrees. It should be understood that the rim bracer 120 could be positioned at a substantial angle ranging from 0 degrees and 180 degrees relative to the handle 110 to bring the portable, hand-operated, and foldable tire removal and/or installation tool assembly 100 in a folded position, a semi-deployed position (FIGS. 8-12) and a deployed position (FIG. 1).

Figure 3:
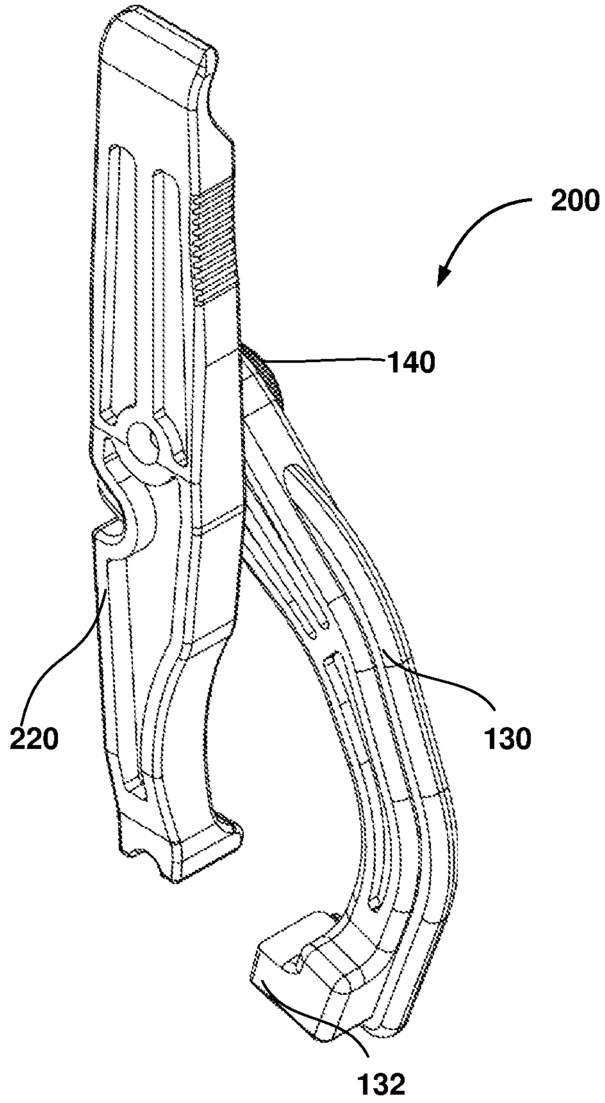
FIG. 3 illustrates a front-perspective view of a portable, hand-operated, and foldable tire removal and/or installation tool assembly in a deployed position, according to an embodiment of the present invention.

In an embodiment as seen in FIG. 3, the rim bracer 120 and the handle 130 are integrally connected to define a long-integrated handle and the rim bracer 220.

Figure 6:
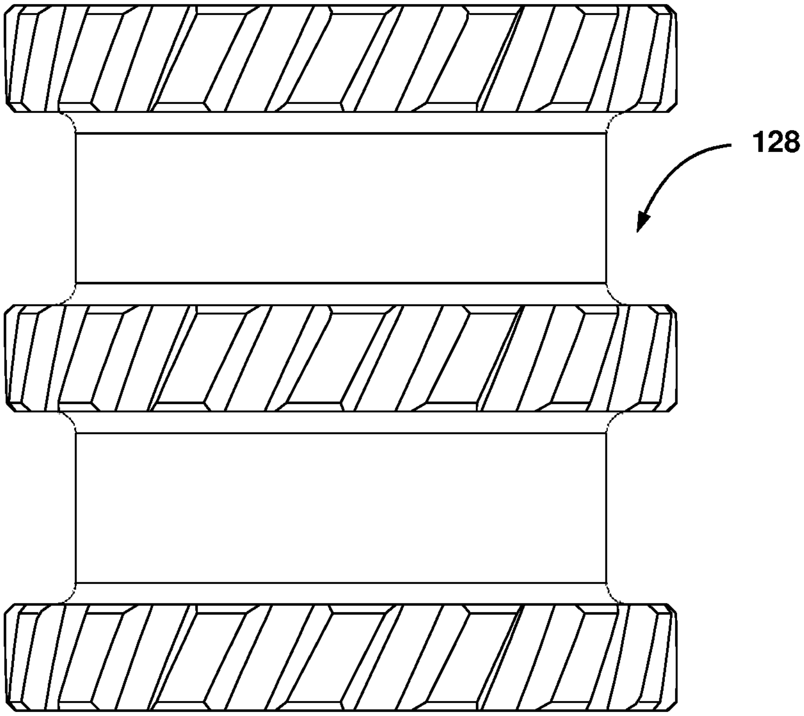
FIG. 6 illustrates a front view of the threaded insert of the rim bracer of FIG. 5.
Figure 7:
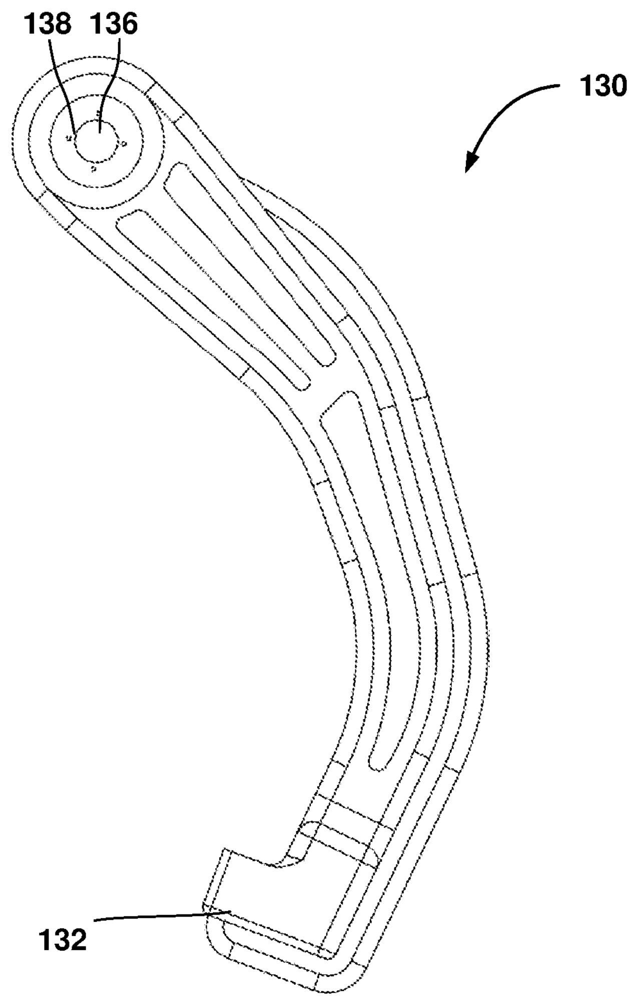
FIG. 7 illustrates a bead gripper of the portable, hand-operated, and foldable tire removal and/or installation tool assembly of FIG. 1.
Figure 8:
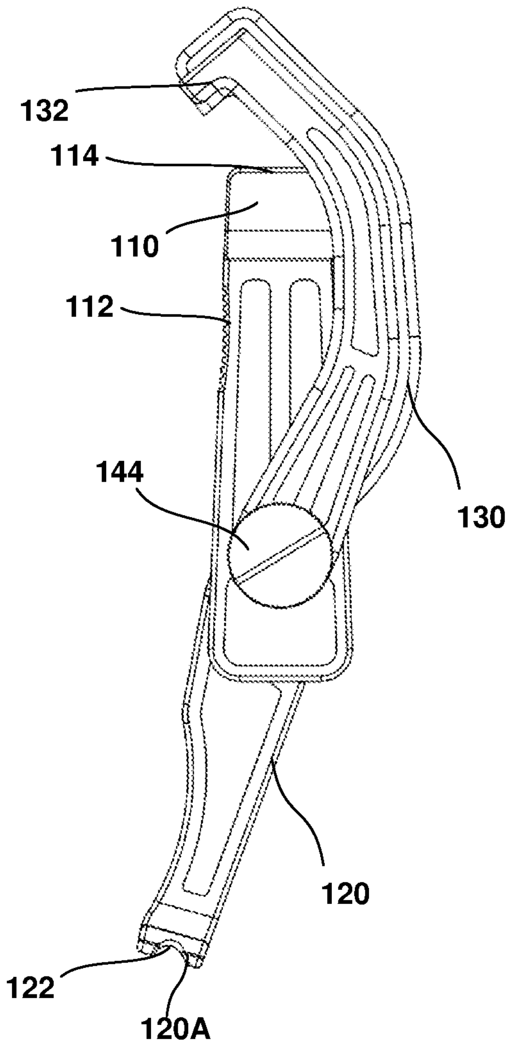
FIGS. 8-10 illustrate various views of the portable, hand-operated, and foldable tire removal and/or installation tool assembly of FIG. 1 in a semi-deployed position.
Figure 9:
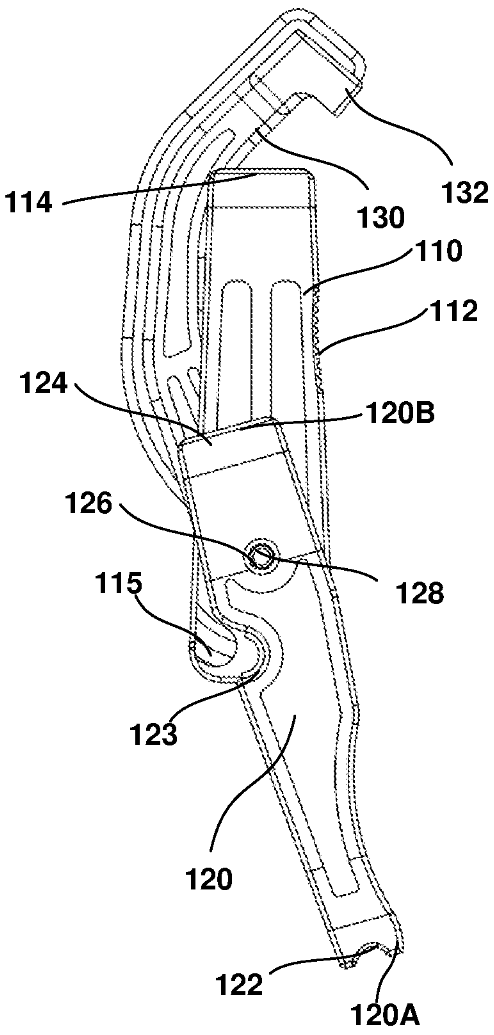
Figure 10:
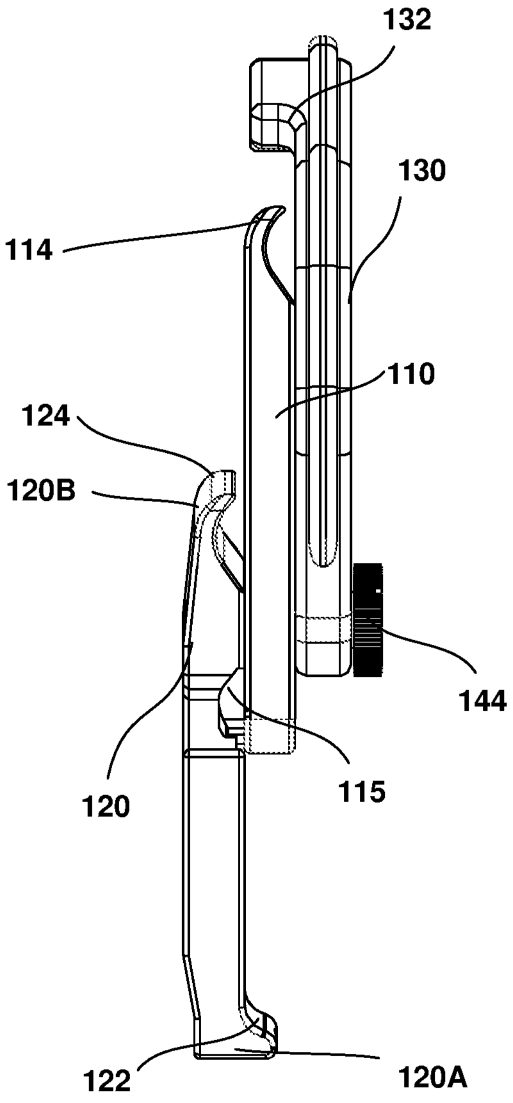
Figure 11:
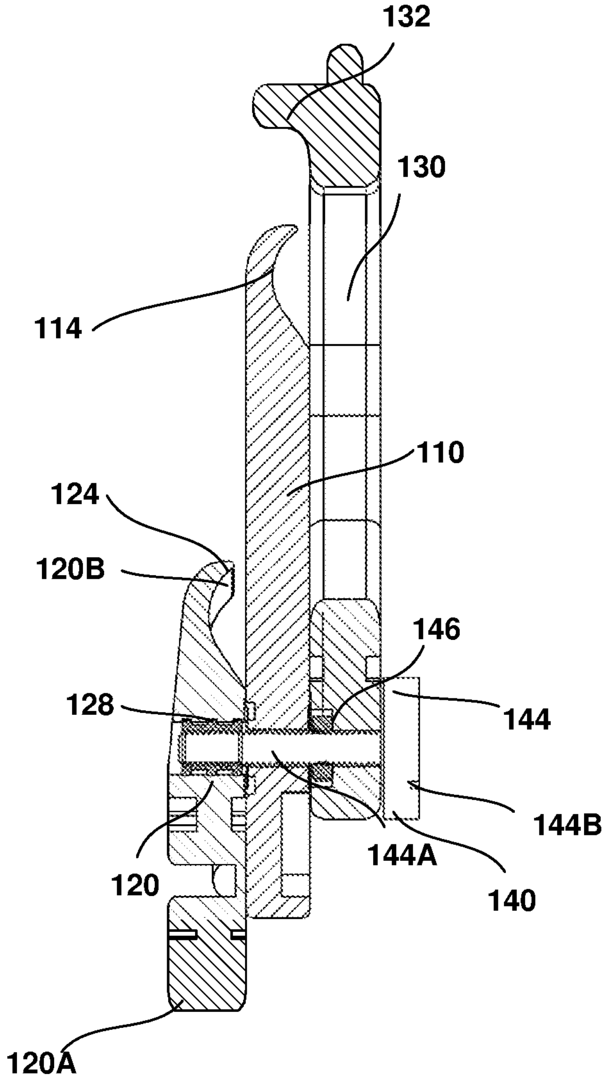
FIG. 11 illustrates a cross-sectional view of the portable, hand-operated, and foldable tire removal and/or installation tool assembly of FIG. 10 in a semi-deployed position.
Figure 12:
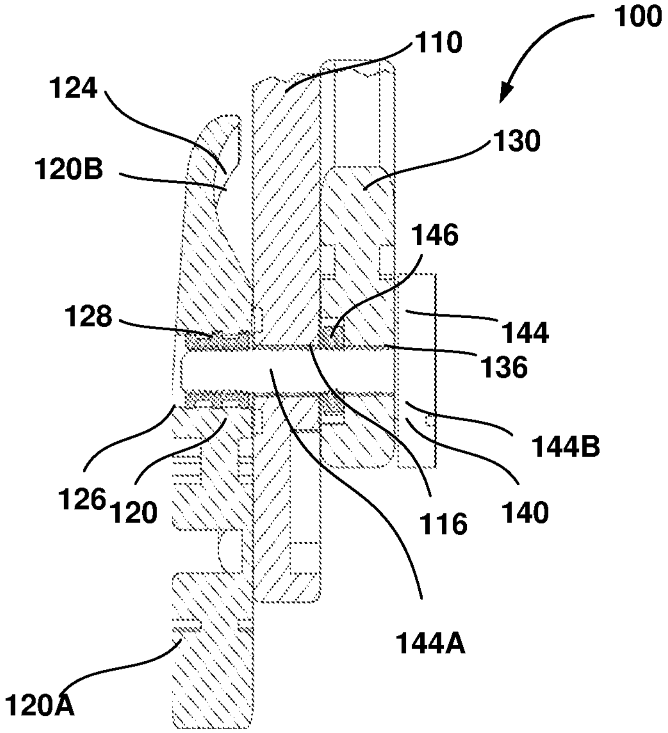
FIG. 12 illustrates a sectional view of the portable, hand-operated, and foldable tire removal and/or installation tool assembly of FIG. 11, according to an embodiment of the present invention.
Figure 13:
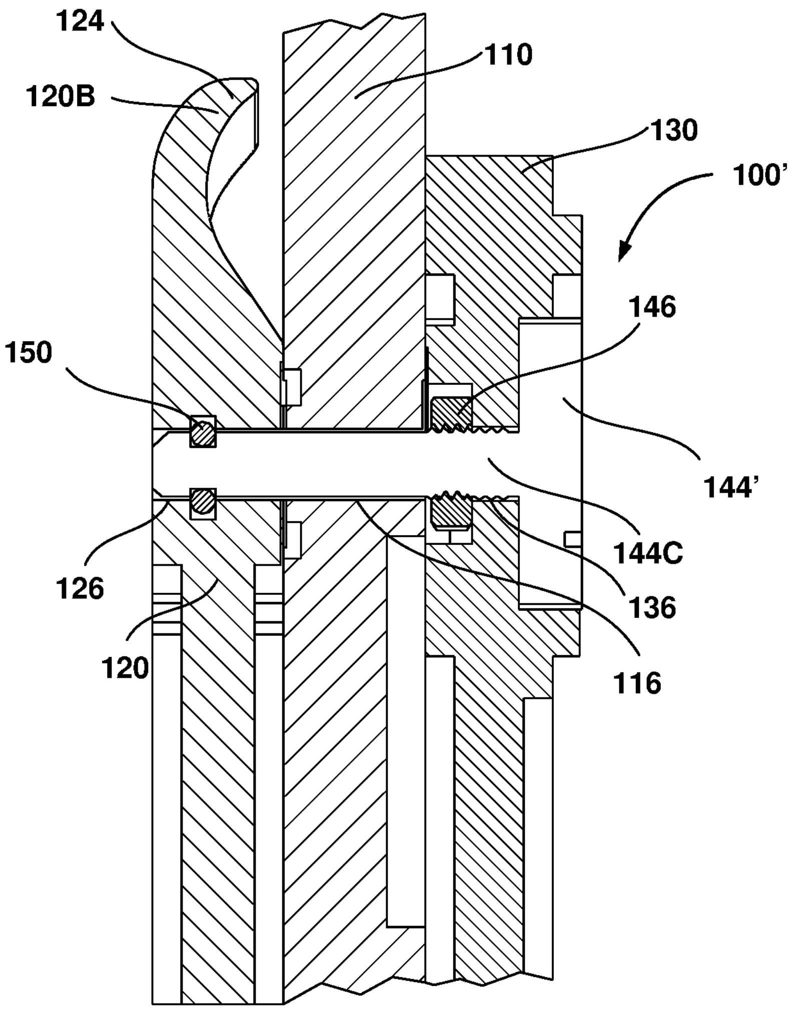
FIG. 13 illustrates a sectional view of the portable, hand-operated, and foldable tire removal and/or installation tool assembly of FIG. 11, according to another embodiment of the present invention.
Figure 14:
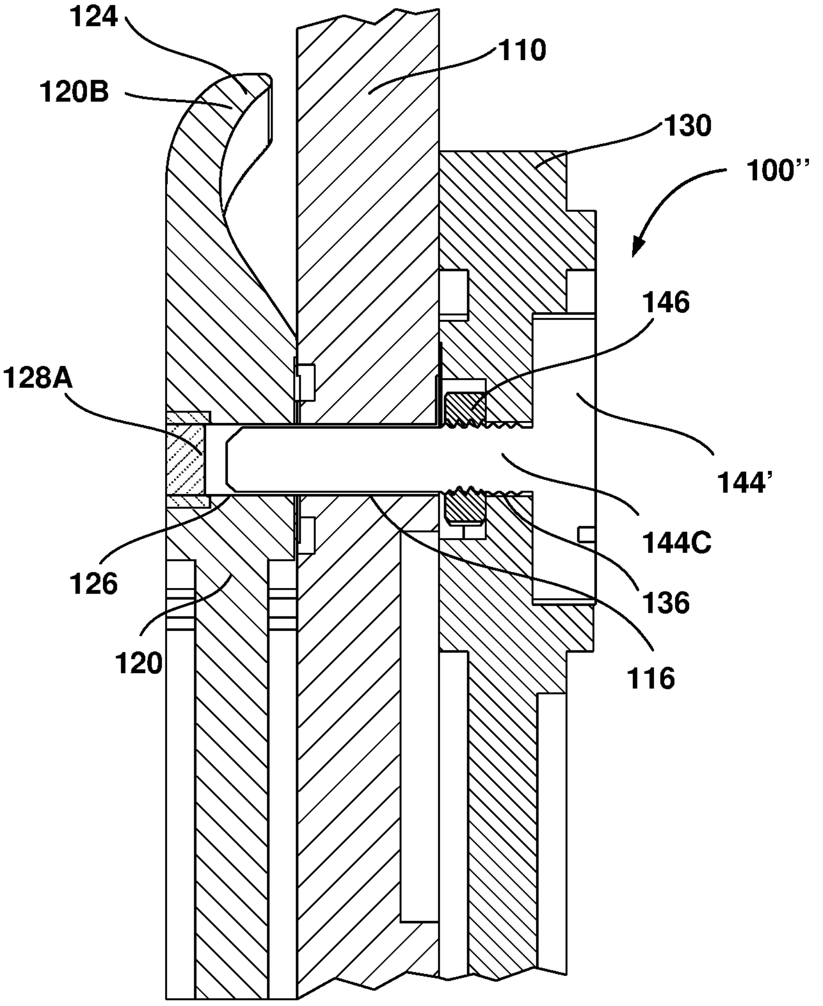
FIG. 14 illustrates a sectional view of the portable, hand-operated, and foldable tire removal and/or installation tool assembly of FIG. 11, according to yet another embodiment of the present invention.

In an embodiment as seen in FIG. 2, FIG. 6, and FIG. 12, the circular hole 126 is configured to allow the installation of a threaded insert 128 (FIG. 6). In another embodiment as seen in FIG. 13, the circular hole 126 is configured to allow installation of a canted coil spring 150 and the passage of a threaded shank 144A of the thumbscrew 144. In yet another embodiment as seen in FIG. 14, the circular hole 126 is configured to allow installation of a magnetic insert 128A and the passage of a threaded shank 144A of the thumbscrew 144.

FIG. 3 illustrates a front-perspective view of a portable, hand-operated, and foldable tire removal and/or installation tool assembly 200 in a deployed position, according to another embodiment of the present invention. The portable, hand-operated, and foldable tire removal and/or installation tool assembly 200 is quite similar to portable, hand-operated, and foldable tire removal and/or installation tool assembly 100 of FIGS. 1-2 except modifications associated with the handle and the rim bracer. The portable, hand-operated, and foldable tire removal and/or installation tool assembly 200 comprises a long-integrated handle and the rim bracer 220 which is one-piece in construction. The long-integrated handle and the rim bracer 220 essentially includes a rim bracer 120 integrally connected to the handle 110. The long-integrated handle and the rim bracer 220 would also function as a tire lever. The added advantage of this portable, hand-operated, and foldable tire removal and/or installation tool assembly 200 is that it is simpler in design and easy to manufacture. However, the portable, hand-operated, and foldable tire removal and/or installation tool assembly 200 is slightly difficult to store as the portable, hand-operated, and foldable tire removal and/or installation tool assembly 200 would require more volume for storage.

Referring to FIGS. 1-2, FIG. 7 and FIGS. 11-12, the bead gripper 130 is configured to engage with a tire, and the bead gripper 130 comprises a bead engaging portion 132 that is further configured to displace the tire bead relative to the rim of the wheel. The bead gripper 130 comprises a circular hole 136 to allow passage of a thumbscrew 144. Further, the bead gripper 130 comprises a slot 138 to define a space for the threaded nut 146.

As seen in FIGS. 1-2 and FIGS. 8-12, the handle 110, the rim bracer 120, and the bead gripper 130 are rotatably connected by a connection mechanism 140 along a rotational axis X-X (represented by an imaginary dotted line in FIG. 2). The connection mechanism 140 is configured to be operated by a user to selectively deploy the portable, hand-held, and foldable tire removal and/or installation tool assembly 100 in either: a deployed position, a semi-deployed position and a folding position by enabling rotation of at least one of: the handle 110, the rim bracer 120, and the bead gripper 130. In the folding position, the handle 110, the rim bracer 120, and the bead gripper 130 are arranged to occupy minimal space to allow for convenient storage. In an exemplary embodiment (not shown in figures), the handle 110, the rim bracer 120, and the bead gripper 130 are positioned in a linear relationship such that the handle 110, the rim bracer 120, and the bead gripper 130 lie on top of one another similar to the "Swiss army knife" concept to reduce the overall space needed for storage in locations such as but not limited to: bicycle saddle bag, bike jersey and so on. In the deployed position as seen in FIGS. 1-2 and FIGS. 8-12, the portable, hand-held, and foldable tire removal and/or installation tool assembly 100 is configured to remove and/or install tire on the rim of a wheel.

The connection mechanism 140 is further configured to selectively enable quick and easy disassembly and later reassembly of the portable, hand-held, and foldable tire removal and/or installation tool assembly 100. In an embodiment as seen in FIGS. 1-2 and FIGS. 8-12, the connection mechanism 140 comprises a thumbscrew 144 and a threaded nut 146. The thumbscrew 144 includes a threaded shank 144A that is substantially linear in shape and the threaded shank 144A screwably engages the threaded nut 146 and the threaded insert 128 (FIG. 6). The threaded shank 144A is connected to the bead gripper 130 using the threaded nut 146. A rotation element 144B is disposed at an end of the threaded shank 144A, and the rotation element 144B is configured to be rotated by the fingers of the user. The user can assemble and disassemble the portable, hand-held, and foldable tire removal and/or installation tool assembly 100 by screwing (inserting) and unscrewing (removing) the thumbscrew 144 relative to the threaded insert 128 (FIG. 6) respectively.

FIG. 13 illustrates a sectional view of the portable, hand-operated, and foldable tire removal and/or installation tool assembly 100', according to another embodiment of the present invention. The portable, hand-operated, and foldable tire removal and/or installation tool assembly 100' is quite similar to the portable, hand-operated, and foldable tire removal and/or installation tool assembly 100 of FIGS. 1-2 and FIGS. 8-12 except for the modifications associated with the circular hole of the rim bracer and the connection mechanism. As seen in FIG. 13, the thumbscrew 144' includes a partially threaded shank 144C. A canted coil spring 150 is housed in the circular hole 126 of the rim bracer 120 such that the partially threaded shank 144C could be easily and quickly connected and disconnected (assembled and disassembled) to the rim bracer 120 by using the spring force exerted by the canted coil spring 150. When the rim bracer 120 is connected to the partially threaded shank 144C, a user can disconnect the rim bracer 120 by applying an away force greater than the spring force exerted by the canted coil spring 150 housed in the circular hole 126 of the rim bracer 120 and vice versa.

FIG. 14 illustrates a sectional view of the portable, hand-operated, and foldable tire removal and/or installation tool assembly 100", according to yet another embodiment of the present invention. The portable, hand-operated, and foldable tire removal and/or installation tool assembly 100" is quite similar to the portable, hand-operated, and foldable tire removal and/or installation tool assembly 100' of FIG. 13 except for the modifications associated with the circular hole of the rim bracer and the connection mechanism. As seen in FIG. 14, the thumbscrew 144' includes a partially threaded shank 144C made of a magnetic material. A magnetic threaded insert 128A is housed inside the circular hole 126 of the rim bracer 120. The partially threaded shank 144C made of a magnetic material is magnetically attracted to the magnetic threaded insert 128A. When the rim bracer 120 is connected to the partially threaded shank 144C made of a magnetic material, a user can disconnect the rim bracer 120 by applying an away force greater than the magnetic force produced by the magnetic threaded insert 128A housed in the circular hole 126 of the rim bracer 120 and the partially threaded shank 144C made of a magnetic material and vice versa.

An exemplary method of removing and installing a tire on the rim of a wheel will now be described with reference to FIGS. 1-14.

Firstly, a tool kit is provided that comprises a handle 110, a rim bracer 120, a bead gripper 130, and a connection mechanism 140. The tool kit could include a packaging material such as but not limited to: storage bag/pouch/cloth or a pre-packaged plastic package and so on that further includes the handle 110, a rim bracer 120, a bead gripper 130, and a connection mechanism 140. Further, the tool kit could exclude any packaging material and the tool kit could consist of the handle 110, the rim bracer 120, the bead gripper 130, and the connection mechanism 140. Optionally, accessories such as a screwdriver, spare parts such as threaded nuts, etc are also provided in the tool kit.

Afterwards, the tire from the rim of the wheel is removed by using at least one of the integrated tire lever 114 of the handle 110 and the integrated tire lever 124 of the rim bracer 120. The Tire is now removed from the rim. The tire can be repaired by using suitable tools such as glue, a puncture kit, and so on. Further, the removed tire can also be replaced by another new tire if the removed old tire is worn out and beyond repair. The handle 110, the rim bracer 120, the bead gripper 130, and the connection mechanism 140 are connected to thereby assemble (form) a portable, hand-held, and foldable tire removal and/or installation tool assembly 100 in a deployed position; wherein the handle 110, the rim bracer 120, and the bead gripper 130 are rotatably connected by a connection mechanism 140.

Now, the user grips and manipulates the gripping portion 112 of the handle 110 to engage the rim engaging portion 122 of the rim bracer 120 with the edge of the rim of the wheel and engage the bead engaging portion 132 of the bead gripper 130 with the tire bead, and then further manipulates the gripping portion 112 of the handle 110 to displace the tire bead relative to the rim of the wheel by the bead engaging portion of the 132 of the bead gripper 130, to thereby install the tire on the rim of the wheel. Afterward, the user can deploy the portable, hand-held, and foldable tire removal and/or installation tool assembly 100 in a folding position after use to occupy minimal space to allow for convenient storage. Further, the user can disassemble the portable, hand-held, and foldable tire removal and/or installation tool assembly 100 after use by using the connection mechanism 140.

The various components and parts of the various embodiments of the portable, hand-held, and foldable tire removal and/or installation tool assembly (100, 100', 100") of the present invention are similar and interchangeable. Further, it should be understood that the components of the portable, hand-held, and foldable tire removal and/or installation tool assembly (100, 100', 100"), in particular, the handle 110, the rim bracer 120, the bead gripper 130 and the connection mechanism 140 can be made of any material having sufficient strength and capable of withstanding relatively large forces such as but not limited to rigid plastic, metal, and combinations thereof and so on. Over molding a softer plastic over metal in locations where the portable, hand-held, and foldable tire removal and/or installation tool assembly (100, 100', 100") touches the rim of the wheel could also be used.

Finally, while the present invention has been described above with reference to various exemplary embodiments, many changes, combinations, and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A portable, hand-operated, and foldable tire removal and/or installation tool assembly (100, 100', 100"), comprising:

a handle (110) comprising a gripping portion (112) that is configured to be gripped and manipulated by the hands of a user, the handle (110) further comprises an integrated tire lever (114) to facilitate the removal of the tire from a rim of a wheel;

a rim bracer (120) comprising a rim engaging portion (122) at a first side (120A) that is configured to engage with an edge of the rim of the wheel, the rim bracer (120) further comprises an integrated tire lever (124) disposed at an opposite second side (120B) to facilitate removal of the tire from the rim of the wheel;

a bead gripper (130) comprising a bead engaging portion (132) that is configured to engage with a tire bead, wherein the bead engaging portion (132) of the bead gripper (130) is further configured to displace the tire bead relative to the rim of the wheel;

wherein the handle (110), the rim bracer (120), and the bead gripper (130) are rotatably connected by a connection mechanism (140);

wherein the connection mechanism (140) is configured to selectively deploy the portable, hand-held, and foldable tire removal and/or installation tool assembly (100) in either: a deployed position or a folding position by enabling rotation of at least one of: the handle (110), the rim bracer (120), and the bead gripper (130);

wherein the connection mechanism (140) is further configured to be operated to selectively enable disassembly and reassembly of the portable, hand-held, and foldable tire removal and/or installation tool assembly (100); and wherein the handle (110) comprises a detent (115), and the rim bracer (120) comprises a curvilinear slot (123) to limit the angular range of the rotation of the rim bracer (120) relative to the handle (110); and wherein the detent (115) and the curvilinear slot (123) are shaped to have an undercut feature on their respective contact surfaces.

2. The portable, hand-held, and foldable tire removal and/or installation tool assembly (100, 100', 100") of claim 1, wherein in the folding position, the handle (110), the rim bracer (120), and the bead gripper (130) are arranged to occupy minimal space to allow for convenient storage; and in the deployed position, the portable, hand-held, and foldable tire removal and/or installation tool assembly (100, 100', 100") is configured to remove and/or install tire on the rim of the wheel.

3. The portable, hand-held, and foldable tire removal and/or installation tool assembly (100, 100', 100") of claim 1, wherein the wheel is selected from a group of wheels consisting of a bicycle wheel, a tricycle wheel, a motorcycle wheel, and a car wheel.

4. The portable, hand-held, and foldable tire removal and/or installation tool assembly (100, 100', 100") of claim 1, wherein the handle (110) comprises a plurality of female projections (117) positioned in proximity of a circular hole (116), and the rim bracer (120) comprises a plurality of male projections (127) formed in proximity of a circular hole (126) that are configured to selectively engage with the plurality of female projections (117) of the handle (110) to lock and/or unlock the handle (110) relative to the rim bracer (120).

5. The portable, hand-held, and foldable tire removal and/or installation tool assembly (100, 100', 100") of claim 1, wherein the connection mechanism (140) comprises a thumbscrew (144), and a threaded nut (146).

6. The portable, hand-held, and foldable tire removal and/or installation tool assembly (100, 100', 100") of claim 1, wherein the rim bracer (120) comprises a threaded insert (128).

7. The portable, hand-held, and foldable tire removal and/or installation tool assembly (100, 100', 100") of claim 1, wherein the rim bracer (120) comprises a magnetic insert (128A).

8. The portable, hand-held, and foldable tire removal and/or installation tool assembly (100, 100', 100") of claim 1, wherein the handle (110), the rim bracer (120), the bead gripper (130), and the connection mechanism (140) are made of at least a rigid plastic, a metal, and a soft plastic-metal combination.

9. The portable, hand-held, and foldable tire removal and/or installation tool assembly (100, 100', 100") of claim 1, wherein the handle (110) and the rim bracer (120) are integrally connected to define a long-integrated handle and the rim bracer (220).

10. A method of removing and installing a tire on a rim of a wheel comprising the steps of:

providing a tool kit comprising a handle (110), a rim bracer (120), a bead gripper (130), and a connection mechanism (140);

removing the tire from the rim of the wheel by using at least one of: an integrated tire lever (114) of the handle (110), and an integrated tire lever (124) of the rim bracer (120);

connecting, the handle (110), the rim bracer (120), the bead gripper (130), and the connection mechanism (140) to thereby assemble a portable, hand-held, and foldable tire removal and/or installation tool assembly (100, 100', 100") in a deployed position; wherein the handle (110), the rim bracer (120), and the bead gripper (130) are rotatably connected by a connection mechanism (140); and gripping and manipulating a gripping portion (112) of the handle (110) to engage a rim engaging portion (122) of the rim bracer (120) with the rim of the wheel and engage a bead engaging portion (132) of the bead gripper (130) with the tire bead, and further manipulating the gripping portion (112) of the handle (110) to displace the tire bead relative to the rim of the wheel by the bead engaging portion (132) of the bead gripper (130), to thereby install the tire on the rim of the wheel, wherein the handle (110) comprises a detent (115), and the rim bracer (120) comprises a curvilinear slot (123) to limit the angular range of the rotation of the rim bracer (120) relative to the handle (110), and wherein the detent (115) and the curvilinear slot (123) are shaped to have an undercut feature on their respective contact surfaces.

11. The method of removing and installing a tire on a rim of a wheel of claim 10 further comprising the additional step of:

deploying, the portable, hand-held, and foldable tire removal and/or installation tool assembly (100) in a folding position after use to occupy minimal space to allow for convenient storage.

12. The method of removing and installing a tire on a rim of a wheel of claim 10, wherein the wheel is selected from a group of wheels consisting of a bicycle wheel, a tricycle wheel, a motorcycle wheel, and a car wheel.

13. The method of removing and installing a tire on a rim of a wheel of claim 10, wherein the handle (110) comprises a plurality of female projections (117) positioned in proximity of a circular hole (116); and the rim bracer (120) comprises a plurality of male projections (127) formed in the proximity of a circular hole (126) that are configured to selectively engage with the plurality of female projections (117) of the handle (110) to lock and/or unlock the handle (110) relative to the rim bracer (120).

14. The method of removing and installing a tire on a rim of a wheel of claim 10 wherein the connection mechanism (140) comprises a thumbscrew (144) and a threaded nut (146).

15. The method of removing and installing a tire on a rim of a wheel of claim 10, wherein the rim bracer (120) comprises a threaded insert (128).

16. The method of removing and installing a tire on a rim of a wheel of claim 10, wherein the rim bracer (120) comprises a magnetic insert (128A).

17. The method of removing and installing a tire on a rim of a wheel of claim 10, wherein the handle (110), the rim bracer (120), the bead gripper (130), and the connection mechanism (140) are made of at least a rigid plastic, a metal, and a soft plastic-metal combination.

* * * * *